United States Patent [19]
Kawachi et al.

[11] Patent Number: 5,621,381
[45] Date of Patent: Apr. 15, 1997

[54] VEHICLE ANTI-THEFT ENGINE CONTROL DEVICE

[75] Inventors: Takashi Kawachi; Kenji Iwasaki; Masanori Matsuura; Satoru Ohtsuka; Shinichi Kubota; Eiji Mutoh, all of Wako, Japan

[73] Assignee: Honda Giken Kogyo Kabushiki Kaisha, Tokyo, Japan

[21] Appl. No.: 464,375

[22] Filed: Jun. 5, 1995

[30] Foreign Application Priority Data

Jan. 27, 1995 [JP] Japan .................................. 7-030253

[51] Int. Cl.$^6$ .................................................. B60R 25/10
[52] U.S. Cl. ........................ 340/426; 307/10.2; 307/10.5
[58] Field of Search ............................. 340/426, 425.5; 307/10.5, 10.2

[56] References Cited

U.S. PATENT DOCUMENTS

| | | | |
|---|---|---|---|
| 4,291,237 | 9/1981 | Kitano | 307/10.3 |
| 4,366,466 | 12/1982 | Lutz | 307/10.5 |
| 4,888,575 | 12/1989 | De Vaulx | 307/10.5 |
| 4,965,460 | 10/1990 | Tanaka et al. | 307/10.2 |
| 5,019,812 | 5/1991 | Göstahagberg et al. | 340/825.31 |
| 5,467,070 | 11/1995 | Drori et al. | 340/426 |
| 5,508,694 | 4/1996 | Treharne et al. | 340/426 |

FOREIGN PATENT DOCUMENTS

| | | |
|---|---|---|
| 0372741 | 6/1990 | European Pat. Off. . |
| 19516246 | 11/1995 | Germany . |
| 4433499 | 3/1996 | Germany . |
| 2046827 | 11/1980 | United Kingdom . |

*Primary Examiner*—Jeffery Hofsass
*Assistant Examiner*—Mohammed R. Ghannam
*Attorney, Agent, or Firm*—Pollock, Vande Sande & Priddy

[57] ABSTRACT

A vehicle anti-theft engine control device enables engine control to be continued even if the data in the memory, wherein an ID code checking result has been stored, incurs "bit change" due to noise or the like, causing the data to change into data prohibiting engine control. The control device comprises a plurality of engine start enable flags for storing information on the enable/disable state of the engine control, enable flag registering means for registering "1" (enable) in all flags in response to a start permit signal, re-registering means for registering again, when "1" has been registered in at least one of the flags, "1" (enable) in all other enable flags, and control enabling means for enabling the engine control in accordance with the registered/reregistered enable flag.

2 Claims, 4 Drawing Sheets

VEHICLE ANTI-THEFT ENGINE CONTROL DEVICE

BACKGROUND OF THE INVENTION

1. Field of the Invention

The present invention is related to a vehicle anti-theft engine control device, and particularly to a vehicle anti-theft engine control device in which the start-up of an engine is enabled on condition that a predetermined relationship is satisfied by an ID code previously registered in a vehicle ignition or the like and another ID code previously registered on the vehicle side.

2. Description of the Prior Art

In some of the various proposals for preventing the theft of a vehicle such as a car, the vehicle is prevented from being started or it is immobilized by mechanical and/or electrical means when it is attempted to be started or moved using a wrong key. This is achieved by previously storing an identification code or a key ID code in a key, reading the key ID code when the key is inserted into a key cylinder to start the vehicle, comparing it with a reference ID code prestored in the vehicle side, generating an enable signal only when there is a match between both ID codes, and enabling the engine to be started only when an engine control unit successfully receives the enable signal. Such a system has been proposed, for instance, in the "Car Technology", Vol. 48, No. 8, 1994, pp. 59–64.

An example of such a conventional transponder type immobilizer is shown in FIG. 6. A key 2 includes a memory (not shown) in which a key ID code (for instance, of 64 bits) is prestored, and a transmitter 4 for transmitting the key ID code. The transmitter 4 of the key 2 and a key cylinder 5 are coupled together by, for instance, an induction coil (antenna) 6.

When the key 2 is inserted into the key cylinder and turned to the ignition ON position, an ignition switch 7 is closed. In response to this, an immobilizer CPU 13 incorporated in an immobilizer HIC 10 in an engine control unit (ECU) 30 operates, and operating electric power is supplied from an antenna unit 19 to the transmitter 4 through the induction coil (antenna) 6. The antenna unit 19 is electrically connected to ECU 30 via a pair of connectors 40 and 50, along with the terminal devices of the drive and control systems essential to the engine control such as the fuel injection valve 17 and the fuel pump 18. The transmitter 4 responds to this to read the key ID code, and transmits it to the key cylinder 5 side.

The received key ID code is amplified by an amplifier (not shown) in the antenna unit 19, read into the CPU 13 through an I/F circuit 12 in the immobilizer HIC 10, and temporarily stored in an appropriate ID code register 13B in the CPU 13. In an EEPROM 14 of the HIC 10, a unique reference ID code assigned to each vehicle is prestored, and the reference ID code and the key ID code which was read in are compared with each other by a compare unit 13S of the CPU 13. If it is determined that there is a match between the two ID codes or they are in a predetermined relationship, an enable code is transmitted from the compare unit 13S to an engine CPU 16. At the same time, a starter relay is activated to initiate the rotation of a starter motor (not shown).

In a ROM 15 of the engine CPU 16, an engine control program is stored which includes at least an engine control algorithm an I/O (Input/Output) control algorithm and an anti-theft algorithm. The engine CPU 16 operates according to the engine control program, and discriminates or verifies the reception of an enable code by the anti-theft algorithm. If the enable code is correct code data, the engine CPU 16 performs a specific control based on the engine control algorithm for the respective terminal devices such as fuel injection valve 17, fuel pump 18 and an ignition control unit 20 connected to the signal port selected by the I/O control algorithm, thereby to enable the start and running of the vehicle.

If the reference ID code stored in the EEPROM 14 and the key ID code transmitted from the key 2 and read in do not match each other or they are not in a predetermined relationship, the compare function unit 13S does not issue an enable code. Accordingly, the start of the vehicle by the CPU 16 is inhibited, and the vehicle's horn is activated by the immobilizer CPU 13 to provide an appropriate alarm.

When the enable code transmitted from the compare unit 13S is not correct code data, the start of the vehicle by the engine CPU 16 is also inhibited. Thus, the illegal start-up of the engine and the driving of the vehicle by a wrong key are prevented to ensure the vehicle anti-theft function.

In the conventional transponder type immobilizer described above, according to the structure wherein the key ID code is compared only once when the power is turned ON, the engine CPU 16 sets "1" (enable) in an engine start enable flag, in which an enabling/disabling of engine control is registered, if the enable code received from an immobilizer HIC 10 is the correct code data; it sets "0" (disable) if the enable code is wrong code data. The enable flag is stored as bit data until the power is turned OFF. After that, the engine CPU 16 periodically checks the enable flag (bit data) and continues the engine control as long as "1" is set (e.g. Japanese Patent Laid-Open No. 54-158532).

if, however, the bit data is changed by a vehicular noise or the like of a traveling vehicle, causing the bit data to be changed to "0" which denotes disable, then the engine CPU 16 undesirably interrupts the engine control.

SUMMARY OF THE INVENTION

An object of the present invention is to provide a vehicle anti-theft engine control unit which enables engine control to be continued even if the data in the memory storing an ID code checking result incurs "bit change" due to noise or the like, causing the data to change into data for prohibiting (disabling) the engine control.

A vehicle anti-theft engine control unit of the present invention comprises a plurality of enable/disable information means for storing information related to the enabling/disabling of the engine control, enable information registering means for registering enable information in all of said enable/disable information storing means when an ID code received from the theft detector is a correct ID code, re-registering means for registering again, when the enable information has been registered in at least one of the enable/disable information storing means, the enable information in every other enable/disable information storing means which does not store the enable information, and control enabling means for enabling the engine control in accordance with the enable information stored in any of the enable/disable information storing means.

With the arrangement described above, when an ID code received from outside the vehicle coincides with the reference ID code, enable information is registered in all enable/disable information storing means. After that, even if the enable information registered in the enable/disable information storing means has partially changed to different information due to vehicular noise or the like of the traveling vehicle, the enable information is re-registered in every other enable/disable information storing means as long as the enable information is registered in at least one of the enable/disable information storing means. Hence, the engine control is performed to continue the vehicle travel even if the registered contents of some enable/disable information storing means are changed from the enable information to different information.

DETAILED DESCRIPTION OF THE PREFERRED EMBODIMENTS

Figure 1:
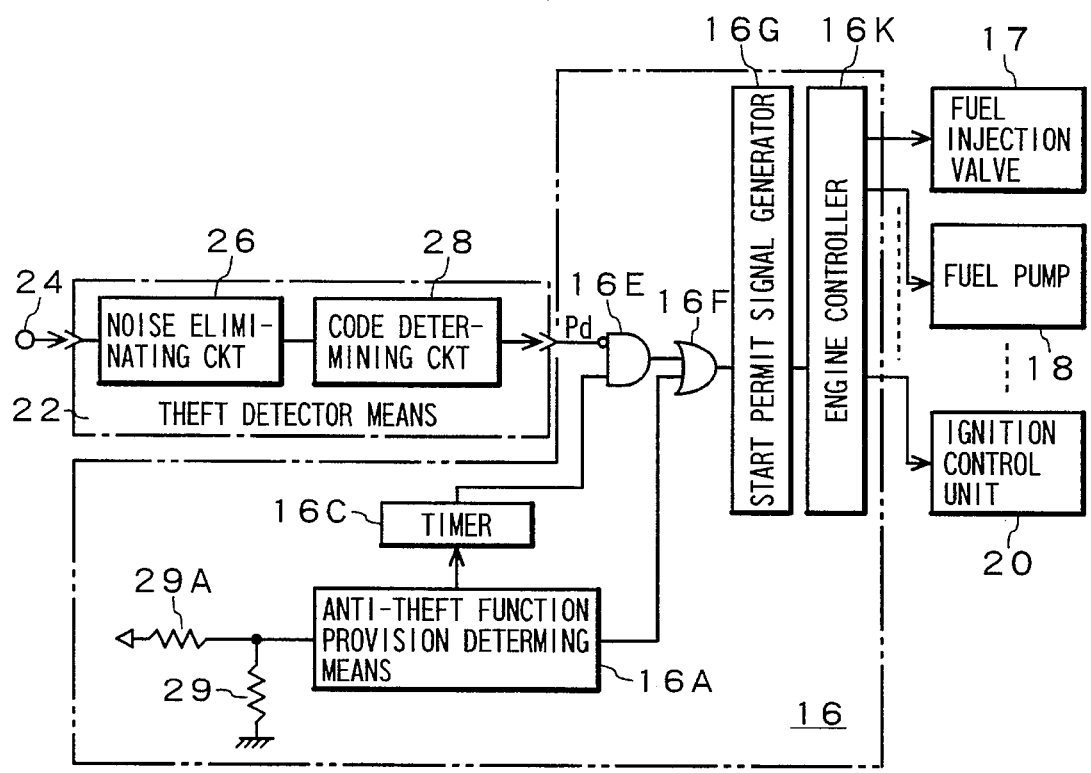
FIG. 1 is a functional block diagram showing the essential section of a first embodiment of the present invention.
Figure 2:
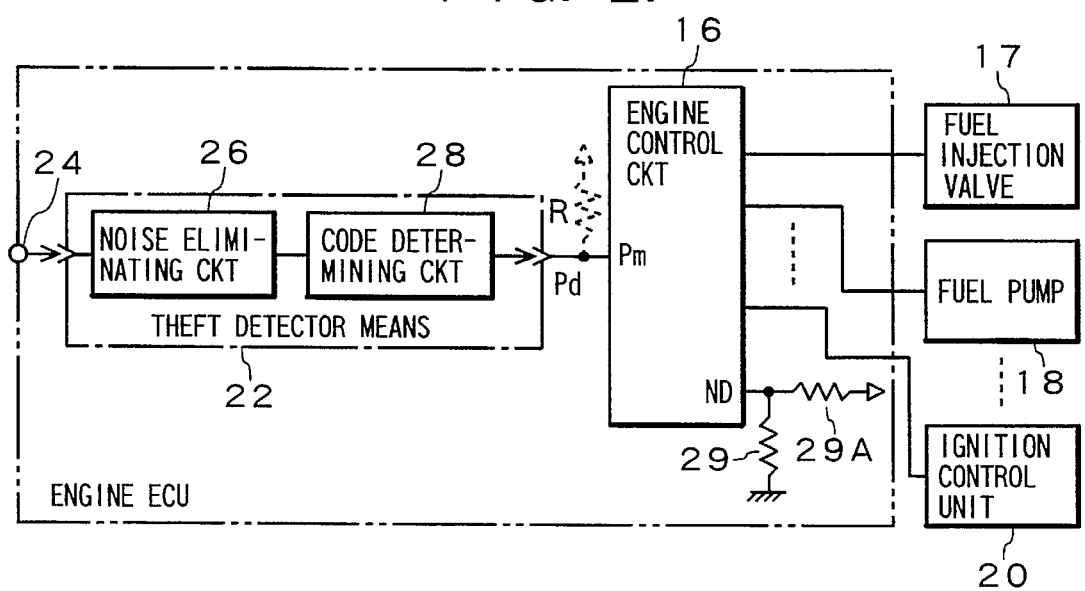
FIG. 2 is a circuit block diagram showing the essential section of a vehicle anti-theft engine control device of the present invention.
Figure 6:
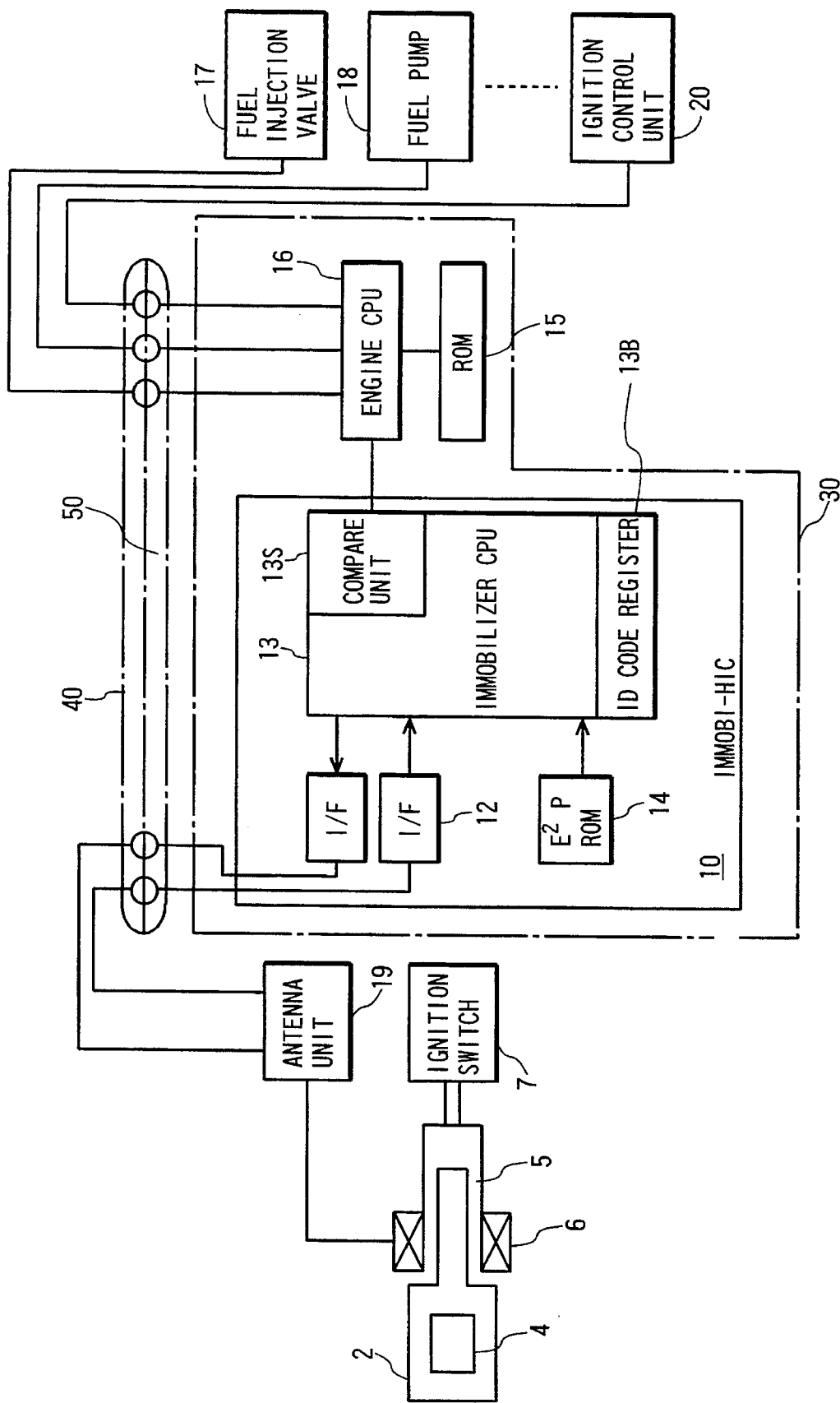
FIG. 6 is a block diagram showing a prior art vehicle anti-theft engine control device.

FIG. 1 is a functional block diagram showing the essential section of the engine control device in the first embodiment of the present invention. FIG. 2 is a block diagram showing the circuit of the engine control device of FIG. 1. In these drawings, the same reference numerals as those of FIG. 6 denote the same or equivaient parts.

A theft detector means 22 comprises a noise eliminating circuit 26 which has an input terminal 24 for receiving the enable signal (code) issued when the key ID code stored in the vehicle ignition key, for example, coincides with the reference code stored beforehand in the immobilizer (not shown) or the like; and a code determining circuit 28 which determines whether a received signal is a correct enable signal or not and which has an output terminal Pd for issuing the validation signal according to the determination result; the theft detector means 22 being demountably mounted on a common circuit board for the engine CPU 16. The engine CPU 16 has voltage dividing resistors 29 and 29A which are connected between the operating power supply and ground, the connection node of the two resistors being inked to a port ND (FIG. 2). Port Pm of the engine CPU 16 is connected to the terminal Pd and also to the operating power supply via pull-up resistor R.

As shown in FIG. 1, the engine CPU 16 comprises an anti-theft function provision determining means 16A, a checking timer 16C, an AND gate 16E which receives the outputs of the checking timer 16C and code determining circuit 28 as two inputs thereof, an OR gate 16F, a start permit signal generating means 16G, and an engine control section 16K. The anti-theft function provision determining means 16A determines whether the engine is equipped with the anti-theft device on the basis of the divided voltage appearing at the connection node of the voltage dividing resistors 29 and 29A, and then it issues a signal indicating the presence of the anti-theft device or another signal indicating the absence of the anti-theft device. The checking timer 16C measures a limit time allowed for checking an inserted ignition key for legality; it is started in response to the signal indicating the presence of the anti-theft function and it issues a "1" signal, then issues a "0" signal after the limit time has elapsed. The OR gate 16F causes the start permit signal generating means 16G to generate the start permit signal in response to the logical OR of the signal indicating the absence of the anti-theft function and the "1" output of the AND gate 16E. The engine control means 16K is activated by the start permit signal to carry out the predetermined engine start and travel control.

Figure 4:
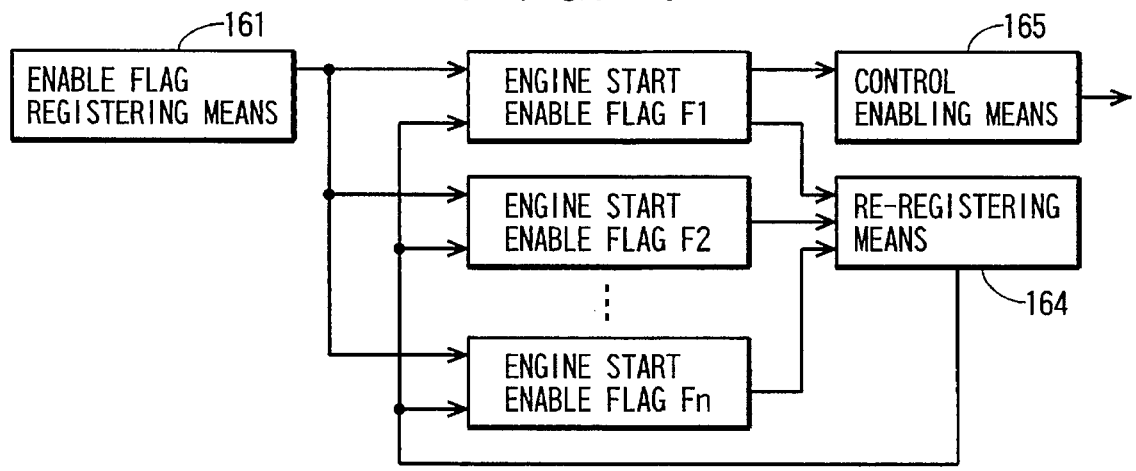
FIG. 4 is a functional block diagram showing another essential section of the present invention.

FIG. 4 is the block diagram showing the function of the said start permit signal generator 16G which is constituted by a plurality of engine start enable flags F1 to Fn for storing the informations on the enabling/disabling of the engine control in terms of flags; enable flag registering means 161 registers "1" (enable) in all enable flags F1 to Fn in response to the signal outputted from the OR gate 16F; re-registering means 164 is used for registering, when "1" (enable) has been registered in at least one of the respective enable flags F1 to Fn, "1" (enable) in every other enable flags; and control enabling means 165 is used for enabling the engine control in accordance with the enable flag.

The operation of the above embodiment will now be described. The enable code mentioned above in relation to FIG. 6 is supplied from an input terminal 24 of the theft detector 22 to the noise eliminating circuit 26 and then it is transferred to the code determining circuit 28. When it is determined that the enable code is legitimate by, for example, comparing it with the reference code stored beforehand in the code determining circuit 28, the code determining circuit 28 generates the validation signal of a predetermined format at the output terminal Pd. The validation signal is comprised of, for example, a pulse train of a predetermined known frequency and duty ratio. The output of the theft detector 22 may be continuously at high level when no enable code is supplied.

In FIG. 2, the validation signal is supplied at the port Pm of the engine CPU 16. The engine CPU 16 determines whether the signal received through port Pm is the predetermined validation signal or not in accordance with the procedure to be discussed later, and causes the engine CPU 16 to perform the engine control operation or disables it in accordance with the determination result. The port Pm is connected to the operation voltage via resistor R to be pulled up, so that the input of port Pm is maintained at a fixed voltage when the theft detector means 22 is removed.

The validation signal discriminating operation of the engine CPU 16 is described with reference to the functional block diagrams of FIGS. 1 and 4 and the flowchart of FIG. 3. In this embodiment, the description will be given assuming that a pair of enable flags F1 and F2 are prepared as the engine start enable flags.

In the experiment of the present inventors, the validation signal discrimination process was determined to be performed, for instance, at every 10 ms by the timer interruption of the engine CPU 16. The cycle of the timer interruption or the sampling interval is determined by the relationship with the cycle of the validation (pulse) signal which is a signal to be detected. In general, from the well-known sampling theorem, it is only required that the interrupt cycle be equal to or shorter than ½ of the pulse cycle.

Figure 3:
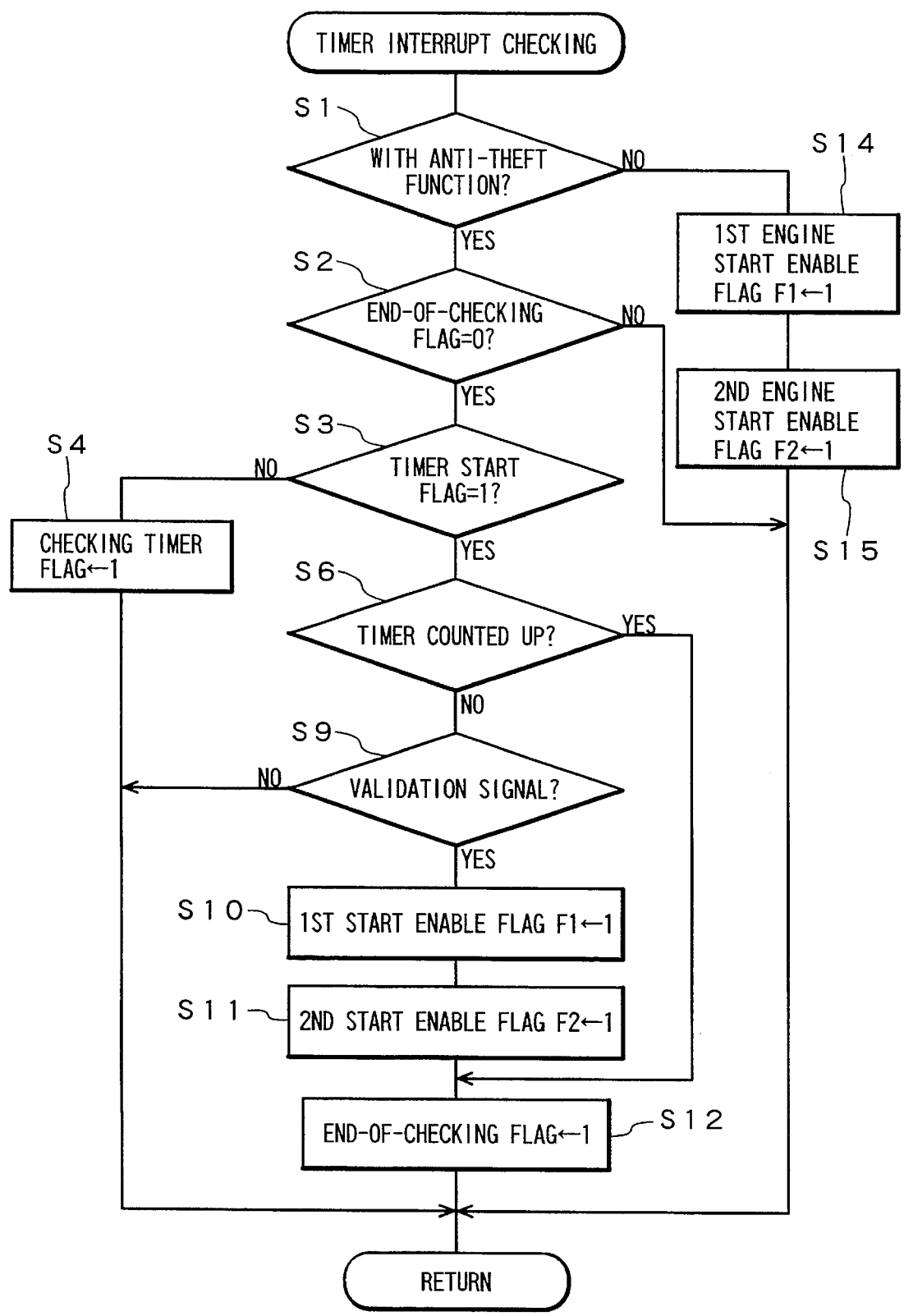
FIG. 3 is a flowchart showing an operation of the validation signal discriminating of FIG. 1.

In step S1 in FIG. 3, it is determined, based on the divided voltage by voltage dividing resistors 29 and 29A, whether or not the vehicle in question is equipped with an anti-theft function. For instance, if the divided voltage is 0 V, it is determined that the anti-theft function is not provided, and if it is 4 V, it is determined that the anti-theft function is provided. If desired, it can be decided what the class or type of its specification is, in other words, the destination area of the particular vehicle. However, since the present invention is not pertinent to determination of the destination of the vehicle, the description is made here on the assumption that only the provision of the anti-theft function is to be determined.

In FIG. 1, this determination is made in the anti-theft function provision determining means 16A. If it is determined that there provided no anti-theft function is provided, the process goes to step S14 to set one of the pair of engine start permit flags, for example, F1, to "1" (enable) by the enable flag registering means 161. The other engine start permit flag, for example, F2, is also set to "1" in step S15. In FIG. 1, the anti-theft function provision determining means 16A enables a start permit signal generator circuit 16G to cause an engine control means 16K to perform an engine start-up control.

If it is determined in step S1 that an anti-theft function is provided, it is discriminated in step S2 whether or not an end-of-checking flag is 0, or if a checking time has not expired yet. The checking time will be described in detail later. In FIG. 1, this discrimination corresponds to whether or not the checking timer 16C has timed up to generate the output "0". First, the end-of-checking flag is "0", and thus the process goes to step S3 to determine whether or not a checking timer start flag is "1" (that is, whether or not the timer 16C for measuring the preset checking period has been started). If the timer has not started yet, it is started and the timer start flag is set to "1" in step S4.

The process of FIG. 3 temporarily returns to the main routine (not shown), and it is resumed by the next timer interruption. These processes correspond to the operation in FIG. 2 in which the anti-theft function provision determining means 16A initiates the checking timer 16C to set its output at "1", and opens the AND gate 16E when it is determined that there provided the anti-theft function is provided.

Since all discriminations in steps S1 to S3 become positive in the subsequent processings, the process goes to step S6 to determine whether or not the time set in the checking timer 16C (in this example, 2.2 sec) has expired. Since it has not yet expired at the beginning, it is determined in step S9 whether or not the validation signal has been correctly received from the theft detector means 22. The process returns to the main routine if the judgement is negative in step S9. Since the inserted ignition key can be determined to be legitimate if the validation signal is received and confirmed while the above processings are repeated, the pair of the engine start permit flags F1 and F2 are set to "1" respectively in steps S10 and S11, and the end-of-checking flag is set to "1" in step S12.

On the other hand, if the checking time expires while the judgement in step S9 is not positive and hence the end-of-checking flag is still zero, the discrimination in step S6 becomes positive, the process goes to step S12, and the end-of-checking flag is set to "1". In other words, it is determined that no validation signal has been received in the theft detector means 22, that is, the ignition key operation is illegal, and the checking operation is terminated in step S12 while keeping the engine start-up disabled. These processings correspond to the operation in FIG. 1 in which the output of the checking timer 16C turns to "0" due to its count up, and the gate 16E is closed to inhibit the validation signal to be transferred to the start permit signal generator 16G from the theft detection means 22.

When the pair of engine start permit flags F1 and F2 are set to "1" respectively in steps S10 and S11, the engine is controlled to start-up. Since the discrimination in step S2 becomes negative after the end-of-checking flag is set to "1", the remaining processings in FIG. 3 are skipped.

Figure 5:
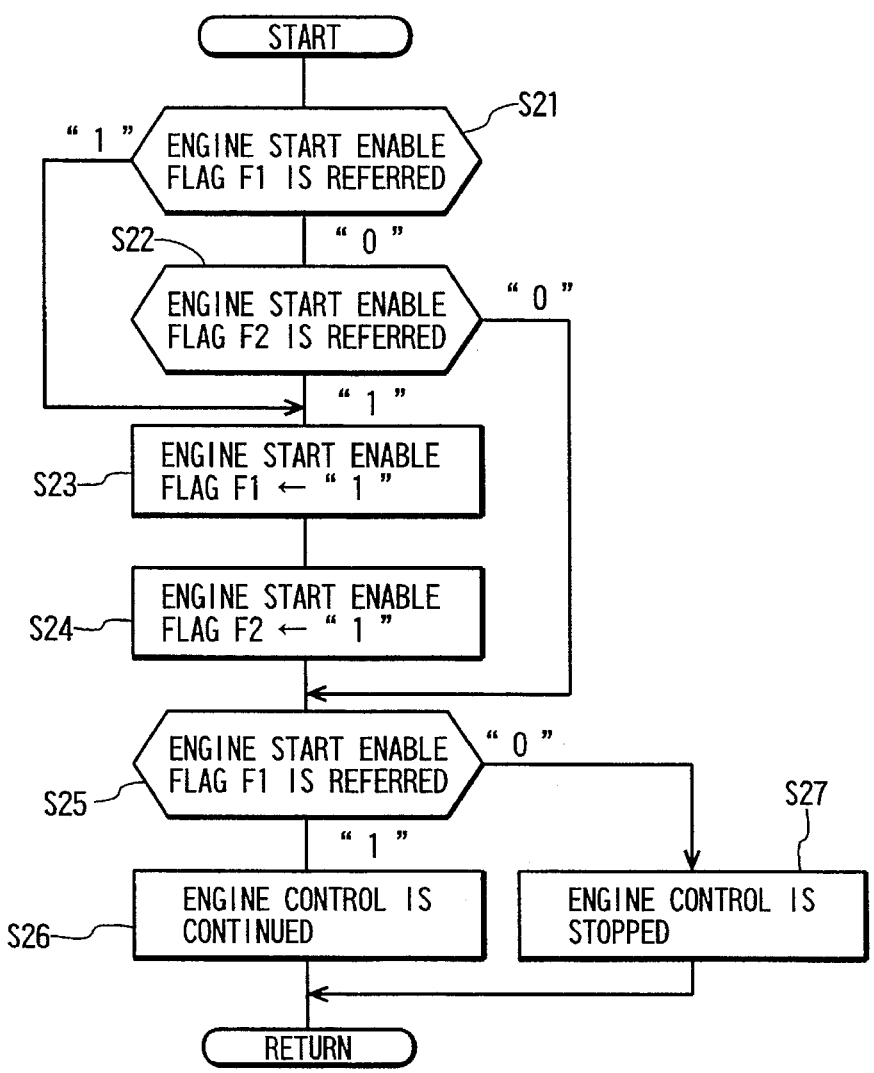
FIG. 5 is a flowchart showing a check operation of the enable flag in FIG. 4.

FIG. 5 is the flowchart showing the operation of determining the enabling/disabling of the engine control which is periodically executed as the background processing of the aforesaid processing.

In step S21, the engine start enable flag F1 is referred to; if the first flag F1 is "0", then the engine start enable flag F2 is referred to in step S22. If both of flags F1 and F2 are "0", then the program proceeds to step S27; if at least one of them is "1", then "1" is set to the engine start enable flag F1 in step S23 and "1" is set to the engine start enable flag F2 in step S24. In step S25, the enable flag F1 is referred to again; if the flag F1 is "1", then the engine control is continued in step S26, but if it is "0," then the engine control is stopped in step S27. The processing of said step S25 may be omitted if the program proceeds from step S24 to step S26 and from step S22 to step S27 when the flag F2 is "0".

Thus, the start-up of the engine and the driving are allowed when a legitimate ignition operation is performed, but it is inhibited for a wrong or an illegal key operation during an attempted theft or the like.

According to the embodiment, there are provided a pair of the engine start enable flags which indicate whether the engine start is enabled or not, so that if these two flags do not coincide with each other, "1" (enable) is registered again in both enable flags. Thus, it is possible to continue the engine control even if either enable flag is changed to a content of other than "1" (enable) by a noise or the like. This prevents vehicle travel from being suddenly prohibited due to a noise while a legitimate key is used.

The above embodiment was described, taking an example where two engine start enable flags F1 and F2 are employed; however, the present invention is not limited only thereto. Three or more enable flags may be provided so that the engine control is enabled as long as "1" (enable) has been registered in at least one enable flag or a predetermined number or more of enable flags.

In the present invention, each of the engine start permit flags shows whether or not start up of the engine is allowed, and if at least one flag shows the enable state start up of the engine control is allowed. Therefore a vehicle which is being driven by use of a correct key will not be stopped by the "bit change" of registered data due to a vehicular noise or the like.

What is claimed is:

1. A vehicle anti-theft engine control unit comprising:

a theft detector for comparing an ID code received from outside a vehicles with a reference ID code stored in the vehicle in advance and for generating a validation signal when the two ID codes have a predetermined relationship; and an engine control means for executing engine start control in response to said validation signal;

said engine control means comprising;

a plurality of enable/disable information storing means for storing information related to the enable and disable of the engine control, enable information registering means for registering enable information in said respective enable/disable information storing means in response to the validation signal received from said theft detector, re-registering means for registering, when the enable information has been registered in at least one of the respective enable/disable information storing means, the enable information in every other enable/disable information storing means which does not store the enable information, and control enabling means for enabling the engine control in accordance with the enable information stored in any of the enable/disable information storing means.

2. A vehicle anti-theft engine control unit according to claim 1, wherein said enable/disable information is stored as a bit-data flag.

* * * * *